United States Patent
Koh et al.

(10) Patent No.: US 8,895,179 B2
(45) Date of Patent: Nov. 25, 2014

(54) CARD BATTERY AND CARD BATTERY CONNECTOR

(75) Inventors: Seok Koh, Suwon-si (KR); Heongsin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 827 days.

(21) Appl. No.: 12/707,053

(22) Filed: Feb. 17, 2010

(65) Prior Publication Data

US 2010/0209761 A1    Aug. 19, 2010

(30) Foreign Application Priority Data

Feb. 18, 2009   (KR) .................. 10-2009-0013485

(51) Int. Cl.
| | |
|---|---|
| *H01M 6/12* | (2006.01) |
| *H01M 10/0585* | (2010.01) |
| *H01M 2/02* | (2006.01) |
| *H01M 6/40* | (2006.01) |

(52) U.S. Cl.
CPC ...... *H01M 10/0585* (2013.01); *H01M 2200/00* (2013.01); *H01M 2/0207* (2013.01); *H01M 6/40* (2013.01); *Y02E 60/12* (2013.01)
USPC .......................................... 429/162; 429/122

(58) Field of Classification Search
CPC . H01M 2/0207; H01M 6/40; H01M 10/0585; H01M 2200/00; Y02E 60/12
USPC ........................................................... 429/162
See application file for complete search history.

(56) References Cited

U.S. PATENT DOCUMENTS

| | | | |
|---|---|---|---|
| 2003/0094924 A1* | 5/2003 | Oh ................................ | 320/128 |
| 2005/0197169 A1* | 9/2005 | Son ................................ | 455/572 |
| 2006/0147792 A1 | 7/2006 | Nelson et al. | |
| 2006/0152191 A1* | 7/2006 | Lee et al. ..................... | 320/106 |

FOREIGN PATENT DOCUMENTS

| | | |
|---|---|---|
| JP | 2001-266955 A | 9/2001 |
| JP | 2003-272582 A | 9/2003 |
| JP | 2005-56854 A | 3/2005 |
| KR | 1020060035457 | 4/2006 |
| KR | 10-2007-0038148 A | 4/2007 |

OTHER PUBLICATIONS

Korean Examination Report dated Aug. 31, 2010.
Korean Notice of Allowance dated Oct. 18, 2011 for Korean Patent Application No. KR 10-2009-0013485 which corresponds to captioned U.S. Appl. No. 12/707,053.

* cited by examiner

*Primary Examiner* — Gary Harris
(74) *Attorney, Agent, or Firm* — Knobbe Martens Olson & Bear LLP

(57) ABSTRACT

A card battery to charge and/or discharge an external electronic apparatus, the card battery including: a card battery body including a bare cell and a first substrate electrically connected to the bare cell; and a connector including a protection circuit module electrically connected to the card battery body.

19 Claims, 2 Drawing Sheets

CARD BATTERY AND CARD BATTERY CONNECTOR

CROSS-REFERENCE TO RELATED APPLICATION

This application claims the benefit of Korean Patent Application No. 2009-13485, filed on Feb. 18, 2009 in the Korean Intellectual Property Office, the disclosure of which is incorporated herein by reference.

BACKGROUND OF THE INVENTION

1. Field of the Invention

Aspects of the present invention relate to a card battery and a card battery connector.

2. Description of the Related Art

Smart cards have been widely used for information storage, information search, information processing, and other operations in the financial service, commercial transactions, transit, identification, and security industries. Generally, smart cards are sized to easily fit into wallets.

Moreover, with the increase in the number of portable electronic products, a rechargeable battery used in most electronic products may be on hand as a backup or a spare. Thus, a recent trend in rechargeable batteries is towards small size, thin thickness, light weight, and high performance.

In order to ensure the practical use of card batteries having the operation of a battery as well as the operation of a smart card used in daily life, a small size and good stability are considered to be important qualities.

Furthermore, in order to popularize the use of card batteries, it is important to fully establish a charge/discharge mode and an information exchange mode between a card battery and an external electronic apparatus.

SUMMARY OF THE INVENTION

Aspects of the present invention provide a card battery having both the operation of a smart card and the operation of a battery. Aspects of the present invention also provide a card battery structured such that a protection circuit module protecting a card battery body is installed in a connector, thus enabling a reduction in size of the card battery body. Aspects of the present invention also provide a card battery including a standard connector to connect a card battery body and an external electronic apparatus, thus encouraging the use of the card battery and enabling the charging/discharging of the card battery body and information exchange between the card battery body and the external electronic apparatus.

According to an aspect of the present invention, there is provided a card battery to charge and/or discharge an external electronic apparatus, the card battery including: a card battery body including a bare cell and a first substrate electrically connected to the bare cell to charge and/or discharge the external electronic apparatus; and a connector to connect the card battery body to the external electronic apparatus, the connector including a protection circuit module electrically connected to the card battery body.

The card battery body may further include an integrated circuit (IC) chip, and the IC chip may further include a flash memory.

The first substrate may be a printed circuit board (PCB).

The protection circuit module may include a second substrate and a protection circuit device provided on the second substrate.

The card battery body may further include a terminal unit connected to the protection circuit module, the terminal unit including a first terminal and a second terminal.

The second substrate may be a PCB or a flexible PCB (FPCB).

The connector may further include: a first connection portion electrically connecting the terminal unit and the protection circuit module; a receiving portion receiving the protection circuit module; and a second connection portion connecting the protection circuit module and an external electronic apparatus.

The second connection portion may have a standard USB or a 24-pin configuration.

The connector may supply power generated from the bare cell to the external electronic apparatus or power generated from the external electronic apparatus to the bare cell, or it may transmit information recorded in the IC chip to the external electronic apparatus or information recorded in the external electronic apparatus to the IC chip.

The connector may be removably coupled to the card battery body.

According to another aspect of the present invention, there is provided a card battery connector removably coupled to a card battery body including a bare cell and an integrated circuit (IC) chip to electrically connect the card battery body to an external electronic apparatus, the card battery connector including: a protection circuit module to electrically connect to the card battery body, the protection circuit module including: a substrate; and a protection circuit device provided on the substrate.

According to another aspect of the present invention, there is provided a card battery connector removably coupled to a card battery body including a bare cell to electrically connect the card battery body to an external electronic apparatus, the card battery connector including: a protection circuit module to electrically connect to the card battery body, the protection circuit module including: a substrate, and a protection circuit device provided on the substrate to prevent an overcharge, an overdischarge, and/or an overcurrent; and a connection portion to electrically connect the bare cell to the external electronic apparatus in order to supply power from the bare cell to the external electronic apparatus and/or to supply power from the external electronic apparatus to the bare cell.

According to yet another aspect of the present invention, there is provided a card battery body removably coupled to a card body connector that electrically connects the card battery body to an external electronic apparatus and includes a protection circuit module to prevent an overcharge, an overdischarge, and/or an overcurrent, the card battery body including: a bare cell to charge and/or discharge the external electronic apparatus through the card body connector.

According to still another aspect of the present invention, there is provided a card battery body removably coupled to a card body connector that electrically connects the card battery body to an external electronic apparatus, the card battery body including: a bare cell to charge and/or discharge the external electronic apparatus through the card body connector; and an integrated circuit (IC) chip to transmit and/or receive information to/from the external electronic apparatus through the card body connector.

According to another aspect of the present invention, there is provided a method of connecting a card battery body to an external electronic apparatus, the method including: connecting a bare cell and an integrated circuit (IC) chip of the card battery body to a connector that is removably coupled to the card battery body; connecting the connector to the external electronic apparatus; supplying, via the connector, power from the bare cell to the external electronic apparatus or from the external electronic apparatus to the bare cell; and transmitting, via the connector, information from the IC chip to the external electronic apparatus or from the external electronic apparatus to the IC chip.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
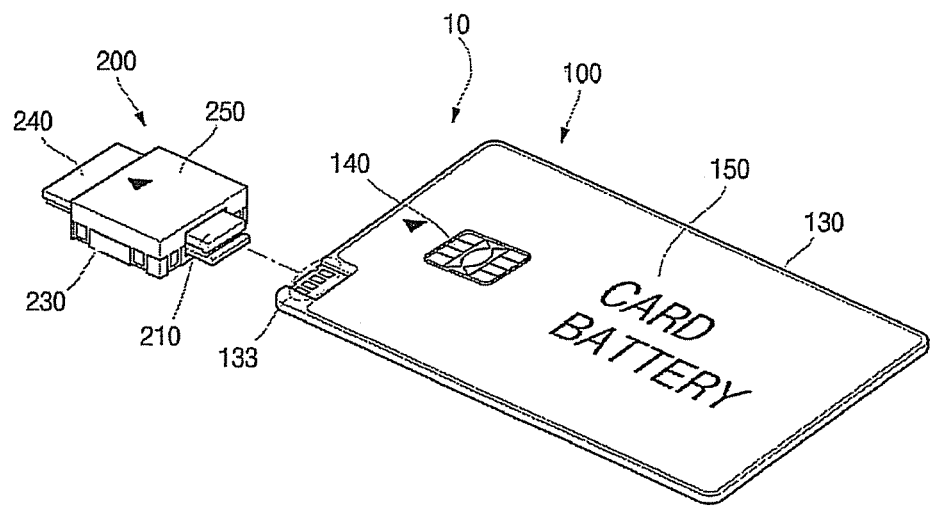
FIG. 1 is a perspective view of a card battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
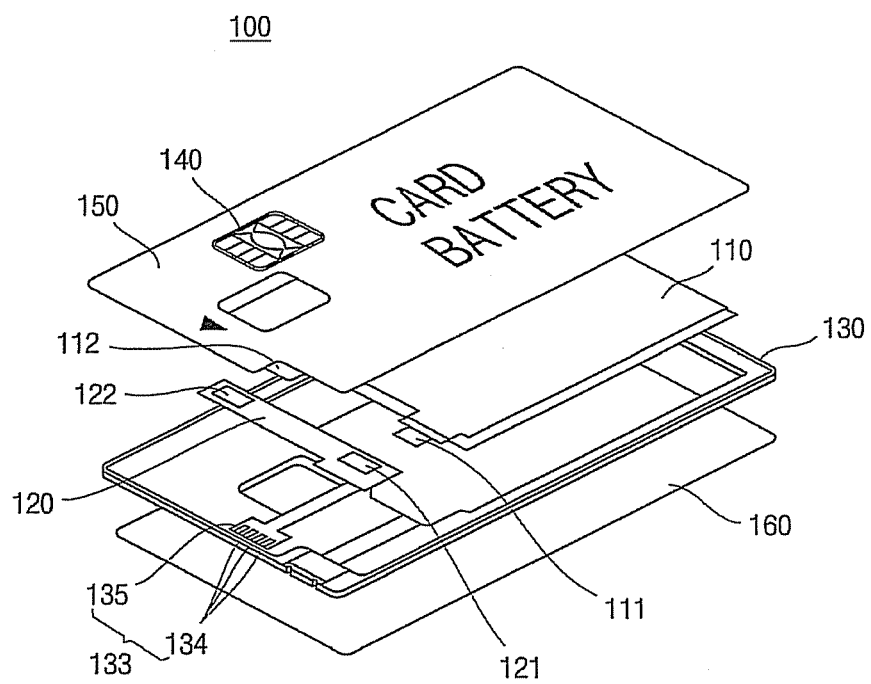
FIG. 2 is an exploded perspective view of a card battery body according to an embodiment of the present invention.
Figure 3:
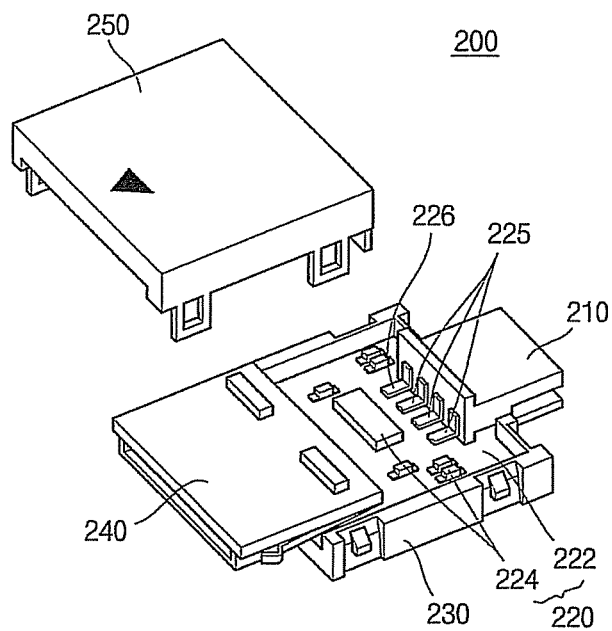
FIG. 3 is an exploded perspective view of a connector according to an embodiment of the present invention.

FIG. 1 is a perspective view of a card battery 10 according to an embodiment of the present invention. FIG. 2 is an exploded perspective view of a card battery body 100 according to an embodiment of the present invention. FIG. 3 is an exploded perspective view of a connector 200 according to an embodiment of the present invention. Referring to FIGS. 1 through 3, the card battery 10 includes the card battery body 100 and the connector 200.

The connector 200 includes a protection circuit module 220 to protect the card battery body 100, thus enabling a reduction in size of the card battery body 100. A connection portion of the connector 200 connects to an external electronic apparatus and has one or more standard connection configurations, thus enabling the charging/discharging of the card battery body 100 and an information exchange between the card battery body 100 and the external electronic apparatus.

The card battery body 100 includes a bare cell 110, a first substrate 120, a frame 130, an integrated circuit (IC) chip 140, a first cover 150, and a second cover 160. The bare cell 110 may include an electrode assembly (not shown) and a pouch (not shown) surrounding the electrode assembly. The electrode assembly may include a first electrode plate (not shown), a second electrode plate (not shown), and a separator (not shown). The electrode assembly may be formed by winding the first electrode plate, the second electrode plate, and the separator interposed therebetween into a jelly-roll type structure. However, it is understood that aspects of the present invention are not limited thereto. For example, according to other aspects, the electrode assembly may also be structured such that the first and second electrode plates are each folded in half and a folded plane of one electrode plate is inserted into the folded planes of the other electrode plate. Furthermore, the separator may be provided between the first electrode plate and the second electrode plate. A first electrode tab 111 and a second electrode tab 112 are provided at an upper side of the bare cell 110 to protrude out of the pouch of the bare cell 110. The bare cell 110 is charged and/or discharged through a first terminal 134 as will be described later, and a connection between the bare cell 110 and an external electronic apparatus is performed by the standard connector 200. A detailed description thereof will be provided later.

The first substrate 120 faces or is adjacent to the first electrode tab 111 and the second electrode tab 112 of the bare cell 110. Furthermore, the first substrate 120 may be a flexible printed circuit board (FPCB). In this case, the first substrate 120 may be formed to a thickness of about 0.1 mm, though aspects of the present invention are not limited thereto. Therefore, it is possible to significantly reduce the thickness of the card battery body 100. The first substrate 120 includes a first lead plate 121 that is electrically connected to the first electrode tab 111 and a second lead plate 122 that is electrically connected to the second electrode tab 112. A terminal unit 133 is provided at a side of the first substrate 120 to be exposed to an outside of the card battery body 100. For example, the terminal unit 133 may be provided at a short side of the card battery body 100, as shown in FIGS. 1 and 2. According to other aspects, the terminal unit 133 may also be disposed at a long side of the card battery body 100 according to a structure of the first substrate 120. For convenience of explanation, aspects of the present invention will be described hereinafter in connection with the embodiment where the terminal unit 133 is provided at a short side of the card battery body 100. The terminal unit 133 includes the first terminal 134 used to charge/discharge the bare cell 110 and a second terminal 135 used for information exchange between the IC chip 140 and an external electronic apparatus. Conductive metal patterns (not shown) may be formed in the first substrate 120 to electrically interconnect the terminal unit 133, the first lead plate 121, and the second lead plate 122.

The frame 130 stably receives the bare cell 110 and the first substrate 120. The frame 130 may be a skeletal structure of the card battery body 100 and may maintain a steady shape of the card battery body 100. Furthermore, the frame 130 may have a rectangular shape, and a center portion of the frame 130 may have a hole to receive the bare cell 110 and the first substrate 120.

Though FIGS. 1 and 2 illustrate the IC chip 140 provided at a short side of the card battery body 100, it is understood that the position of the IC chip 140 on the card battery body 100 is not particularly limited. A card having the IC chip 140 mounted therein may be referred to as an "IC card" or a "smart card". The IC card may be a credit card-sized card embedded with an IC memory and may further include a microprocessor or the like. Moreover, the IC card may have an information storage operation and various intelligence operations (such as computational operations). Also, the IC card may have a larger memory capacity than a common magnetic card, and the IC card can carry out control processing or the like. Thus, the IC card can substitute for other cards performing various operations in the financial service, transit, identification and security industries. A card reader can read information recorded in the IC chip 140 and provide the information to an external electronic apparatus, regardless of the presence of the connector 200.

The IC chip 140 may further include a flash memory to receive and store information from an external electronic apparatus and to transmit the information to another external electronic apparatus. In this case, the IC chip 140 may be connected to the conductive metal patterns of the first substrate 120, and the first substrate 120, together with the IC chip 140, may serve as a main board to perform operations and information processing.

In detail, the IC chip 140 performs information exchange with an external electronic apparatus via the second terminal 135. For this, the card battery body 100 connects to the external electronic apparatus via the standard connector 200. A detailed description thereof will be provided later. As is apparent from the above description, the IC chip 140 may have both the operations of a Subscribe Identification Module (SIM) card and a flash memory.

Therefore, the card battery 10 can perform the operations of a smart card (i.e., information storage and processing) and of a battery (i.e., power supply to an external electronic apparatus).

The first cover 150 and the second cover 160 are respectively provided at top and bottom sides of the frame 130. The first cover 150 and the second cover 160 may be made of a metal (for example, stainless steel (SUS)). The first cover 150 and the second cover 160 may be joined to the frame 130 and/or the bare cell 110 by a double-sided tape (not shown), though aspects of the present invention are not limited thereto. For example, according to other aspects, the first cover 150 and the second cover 160 may be joined to the frame 130 and/or the bare cell 110 by a thermal fusion tape (not shown).

The connector 200 includes a first connection portion 210, the protection circuit module 220, a receiving portion 230, a second connection portion 240, and a cover 250 provided on the protection circuit module 220 and the receiving portion 230. The connector 200 is used to electrically connect the card battery body 100 to an external electronic apparatus and to protect the bare cell 110 of the card battery body 100 from overcharge, overdischarge, and overcurrent.

The first connection portion 210 electrically connects to the terminal unit 133 of the card battery body 100. In more detail, the first connection portion 210 electrically connects to the first terminal 134 used to charge/discharge of the bare cell 110 and the second terminal 135 used for information exchange between the IC chip 140 and an external electronic apparatus. A pad (not shown) contacting the terminal unit 133 may be formed in the first connection portion 210. The pad may transmit current and information from the card battery body 100 to the protection circuit module 220. Though FIGS. 1 and 3 illustrate the first connection portion 210 having a rectangular parallelepiped shape with an opening to engage with the terminal unit 133, it is understood that the shape of the first connection portion 210 is not limited thereto.

The protection circuit module 220 includes a second substrate 222 and a protection circuit device 224. The second substrate 222 electrically connects to the first connection portion 210 via a first plate 225 and a second plate 226. Specifically, the first plate 225 electrically connects to the first terminal 134 via the first connection portion 210, and the second plate 226 electrically connects to the second terminal 135 via the first connection portion 210. The second substrate 222 may be a PCB or a FPCB. Furthermore, conductive metal patterns (not shown) may be formed in the second substrate 222 to electrically interconnect the first connection portion 210, the protection circuit device 224, and the second connection portion 240. Though FIG. 3 illustrates the second substrate 222 having a square shape, it is understood that the shape of the second substrate 222 is not limited thereto.

The protection circuit device 224 may be mounted on the second substrate 222. When the charging/discharging of the bare cell 110 occurs in a state wherein the card battery body 100 is connected to an external electronic apparatus via the connector 200, the protection circuit device 224 protects the card battery body 100 from overcharge and overcurrent and prevents the degradation of the card battery body 100 due to overdischarge.

Conventionally, a common protection circuit device is provided on a substrate included in a card battery body to protect a bare cell from overcharge, overdischarge, and overcurrent. However, a large-sized card battery (i.e., a battery including the protection circuit device) impedes the practical use of the battery. According to aspects of the present invention, the protection circuit device 224 is provided in the connector 200, thereby minimizing the size of the card battery body 100. In other words, the protection circuit device 224 is an element used to stabilize the card battery 10. It is understood that the position of the protection circuit device 224 is not particularly limited in aspects of the present invention, provided that the stability of the battery 10 is not affected. In this regard, in the current embodiment, the protection circuit device 224 used to stabilize the card battery 10 is provided in the connector 200. As a result, an increase in the thickness of the card battery body 100 due to the inclusion of the protection circuit device 224 in the card battery body 100 is prevented, thereby achieving the entire size reduction of the card battery body 100.

The receiving portion 230 receives the protection circuit module 220 to prevent a breakage of the protection circuit module 220 and to serve as a holder to support the first connection portion 210 and the second connection portion 240. Though FIG. 3 illustrates the receiving portion 230 having a rectangular parallelepiped shape with an opening to receive the second substrate 222, it is understood that the shape of the receiving portion 230 is not limited thereto.

The second connection portion 240 may be electrically connected to the second substrate 222. In more detail, the second connection portion 240 may be electrically connected to the pad (not shown) connected to the conductive metal patterns of the second substrate 222. Furthermore, the second connection portion 240 electrically connects to an external electronic apparatus. The second connection portion 240 may have a standard bus configuration (for example, a Universal Serial Bus (USB)) to connect to the external electronic apparatus. Specifically, the external electronic apparatus (such as a computer, a laptop, a workstation, a portable electronic apparatus, etc.) may have a standard USB configuration, and a client electronic apparatus connected to the external electronic apparatus may perform charging, discharging, or information exchange through the standard USB configuration. Thus, according to an embodiment of the present invention, the second connection portion 240 may have a standard USB configuration to apply power to an external electronic apparatus (battery discharge) and to receive power from an external electronic apparatus (battery charge). Moreover, the IC chip 140 can perform communication and information exchange with an external electronic apparatus via the connector 200 (e.g., a USB type connector). However, it is understood that the second connection portion 240 is not limited to a standard USB configuration. For example, according to other aspects, the second connection portion 240 may have a standard 24-pin configuration. Accordingly, the card battery body 100 may connect to an external electronic apparatus with a 24-pin standard so as to perform the charging/discharging of the bare cell 110 and/or information exchange with the external electronic apparatus.

As described above, the card battery 10 has both the operations of a smart card (i.e., information exchange) and a battery (i.e., power supply to an external electronic apparatus). The card battery 10 is structured such that the protection circuit device 224 is provided in the connector 200, thus making the card battery body 100 thinner. Moreover, the card battery body 100 can easily connect to an external electronic apparatus via the standard connector 200, thus improving compatibility with the external electronic apparatus. In addition, the IC chip 140 may include a flash memory, thus providing easier access to information and better information storage capability. Furthermore, the connector may be a standard connector. Thus, it is possible to enhance connection compatibility between a card battery body and an external electronic apparatus, therefore encouraging the use of a card battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A card battery to charge and/or discharge an external electronic apparatus, the card battery comprising:
    a card battery body comprising a bare cell and a first substrate electrically connected to the bare cell to charge and/or discharge the external electronic apparatus; and
    a connector to connect the card battery body to the external electronic apparatus, the connector comprising a protection circuit module mounted therein and electrically connect to the card battery body, wherein the connector is external to the card battery body, wherein the protection circuit module comprises a second substrate and a protection circuit device provided on the second substrate,
    wherein the connector comprises:
        a first connection portion connected to the protection circuit module;
        a receiving portion to receive the protection circuit module; and
        a second connection portion electrically connected to the protection circuit module and to electrically connect to the external electronic apparatus; and
    wherein the protection circuit module is configured to prevent an overcharge, overdischarge, and/or an overcurrent.

2. The card battery as claimed in claim 1, wherein the card battery body further comprises an integrated circuit (IC) chip to exchange information externally.

3. The card battery as claimed in claim 2, wherein the card battery body further comprises a terminal unit provided at a side of the first substrate and exposed to an outside of the card battery body.

4. The card battery as claimed in claim 3, wherein the terminal unit comprises:
    a first terminal electrically connected to the bare cell; and
    a second terminal, different from the first terminal, electrically connected to the IC chip.

5. The card battery as claimed in claim 1, wherein the connector electrically connects the bare cell to the external electronic apparatus.

6. The card battery as claimed in claim 5, wherein the connector supplies power from the bare cell to the external electronic apparatus and/or supplies power from the external electronic apparatus to the bare cell.

7. The card battery as claimed in claim 2, wherein the connector electrically connects the IC chip to the external electronic apparatus.

8. The card battery as claimed in claim 7, wherein the connector transmits information recorded in the IC chip to the external electronic apparatus and/or transmits information recorded in the external electronic apparatus to the IC chip.

9. The card battery as claimed in claim 1, wherein each of the first substrate and the second substrate is a printed circuit board (PCB).

10. The card battery as claimed in claim 1, wherein the connector further comprises a cover provided on the protection circuit module and the receiving portion.

11. The card battery as claimed in claim 1, wherein the connector is removably coupled to the card battery body.

12. The card battery as claimed in claim 1, wherein the second connection portion has one of a standard USB configuration and a standard 24-pin configuration.

13. The card battery as claimed in claim 4, wherein:
    the first terminal electrically connects to the connector to supply power from the bare cell to the external electronic apparatus and/or to supply power from the external electronic apparatus to the bare cell; and
    the second terminal electrically connects to the connector to transmit information recorded in the IC chip to the external apparatus and/or to transmit information recorded in the external apparatus to the IC chip.

14. A card battery connector removably coupled to a card battery body comprising a bare cell and an integrated circuit (IC) chip to electrically connect the card battery body to an external electronic apparatus, the card battery connector comprising:
    a protection circuit module to electrically connect to the card battery body, wherein the protection circuit module is external to the card battery body, the protection circuit module comprising:
        a substrate;
        a protection circuit device provided on the substrate;
        a first connection portion to electrically connect to the card battery body and electrically connected to the protection circuit module;
        a receiving portion to receive the protection circuit module; and
        a second connection portion electrically connected to the protection circuit module and to electrically connect to the external electronic apparatus,
    wherein the protection circuit module is configured to prevent an overcharge, overdischarge, and/or an overcurrent.

15. The card battery connector as claimed in claim 14, wherein the first connection portion and the second connection portion supply power from the bare cell to the external electronic apparatus and/or supply power from the external electronic apparatus to the bare cell.

16. The card battery connector as claimed in claim 15, wherein the first connection portion and the second connection portion transmit information recorded in the IC chip to the external electronic apparatus and/or transmit information recorded in the external electronic apparatus to the IC chip.

17. The card battery connector as claimed in claim 14, wherein the substrate a printed circuit board (PCB) or a flexible PCB (FPCB) and the second connection portion has a standard USB configuration or a 24-pin configuration.

18. A card battery connector removably coupled to a card battery body comprising a bare cell to electrically connect the card battery body to an external electronic apparatus, the card battery connector comprising:
    a protection circuit module to electrically connect to the card battery body, wherein the protection circuit module is external to the card battery body, the protection circuit module comprising:
        a substrate, and a protection circuit device provided on the substrate to prevent an overcharge, an overdischarge, and/or an overcurrent; and a connection portion to electrically connect the bare cell to the external electronic apparatus in order to supply power from the bare cell to the external electronic apparatus and/or to supply power from the external electronic apparatus to the bare cell, wherein the connection portion comprises:
  a first connection portion to electrically connect to the card battery body and electrically connected to the protection circuit module;
  a receiving portion to receive the protection circuit module; and
  a second connection portion electrically connected to the protection circuit module and to electrically connect to the external electronic apparatus.

19. The card battery connector as claimed in claim 18, wherein the first connection portion and the second connection portion transmit information recorded in an IC chip of the card battery body to the external electronic apparatus and/or transmit information recorded in the external electronic apparatus to the IC chip.

* * * * *

UNITED STATES PATENT AND TRADEMARK OFFICE
CERTIFICATE OF CORRECTION

PATENT NO.         : 8,895,179 B2
APPLICATION NO.    : 12/707053
DATED              : November 25, 2014
INVENTOR(S)        : Seok Koh et al.

Page 1 of 1

It is certified that error appears in the above-identified patent and that said Letters Patent is hereby corrected as shown below:

In the Claims

In column 7 at line 26, In Claim 1, change "connect" to --connected--.

In column 7 at line 47, In Claim 3, change "substrate" to --substrate, connected to the first connection portion--.

In column 8 at line 27, In Claim 14, after "module" delete "to".

In column 8 at line 27, In Claim 14, change "connect" to --connected--.

In column 8 at line 56, In Claim 17, after "substrate" insert --is--.

In column 8 at line 63, In Claim 18, after "module" delete "to".

In column 8 at line 63, In Claim 18, change "connect" to --connected--.

Signed and Sealed this
Twenty-ninth Day of September, 2015

Michelle K. Lee
*Director of the United States Patent and Trademark Office*